Feb. 25, 1941. H. E. LINDEMANN 2,233,018
CONTROL DEVICE
Filed Nov. 29, 1937 2 Sheets-Sheet 1
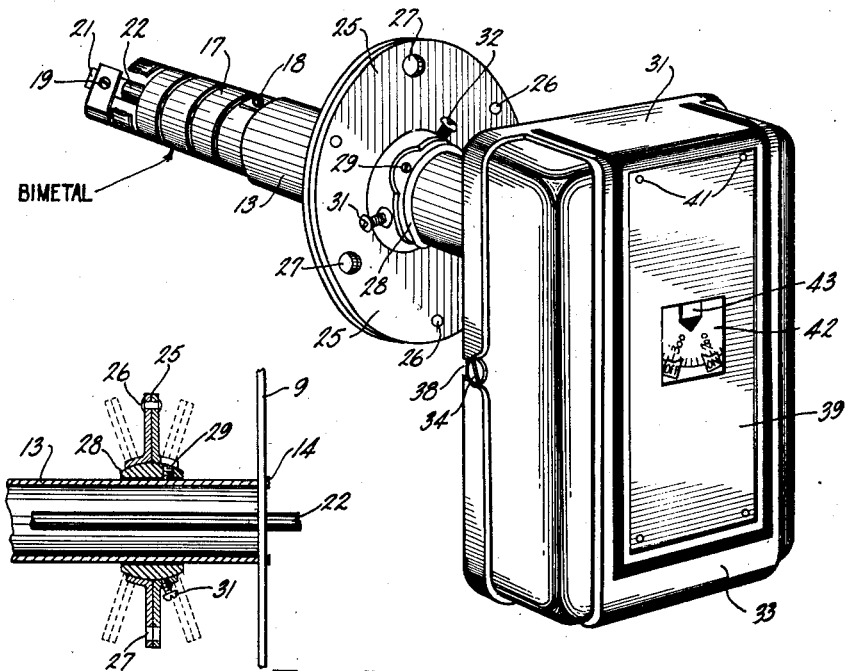
Fig:1
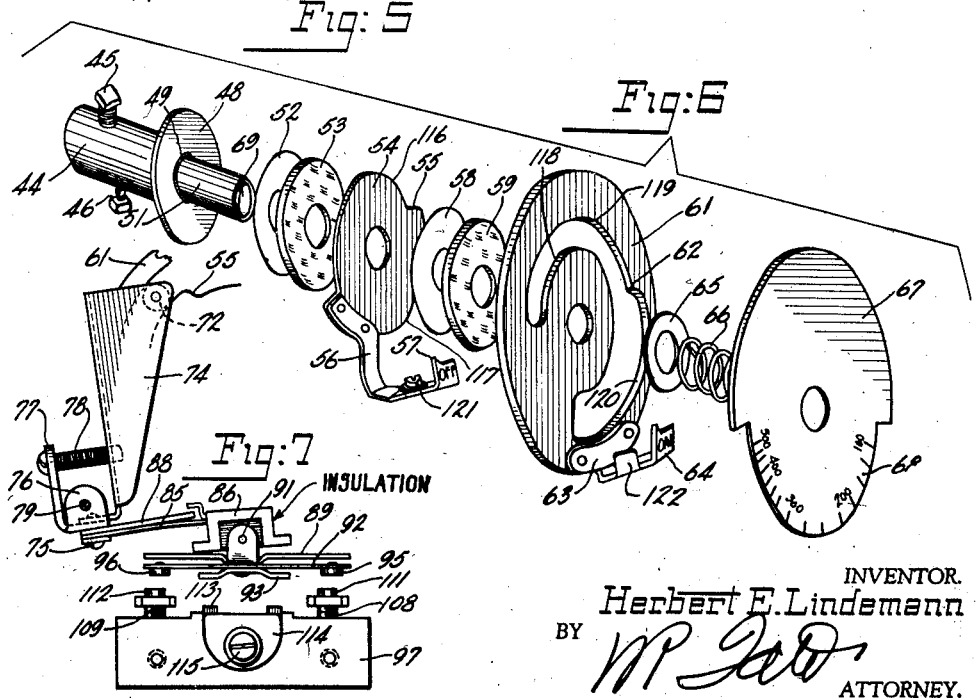
Fig:5
Fig:6
Fig:7
INVENTOR.
Herbert E. Lindemann
BY
ATTORNEY.

Feb. 25, 1941.  H. E. LINDEMANN  2,233,018
CONTROL DEVICE
Filed Nov. 29, 1937  2 Sheets-Sheet 2
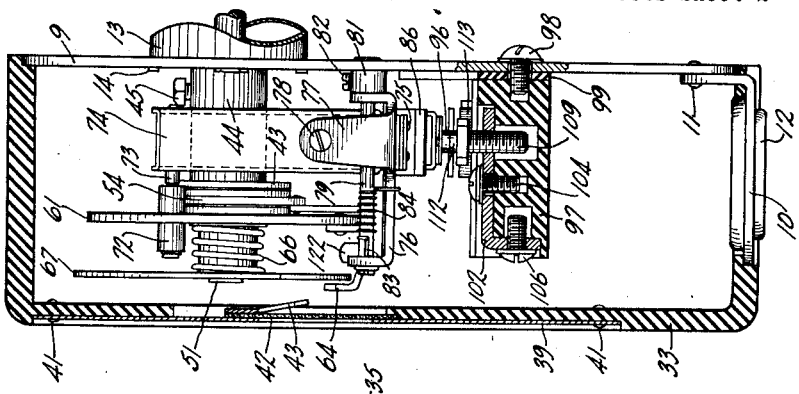
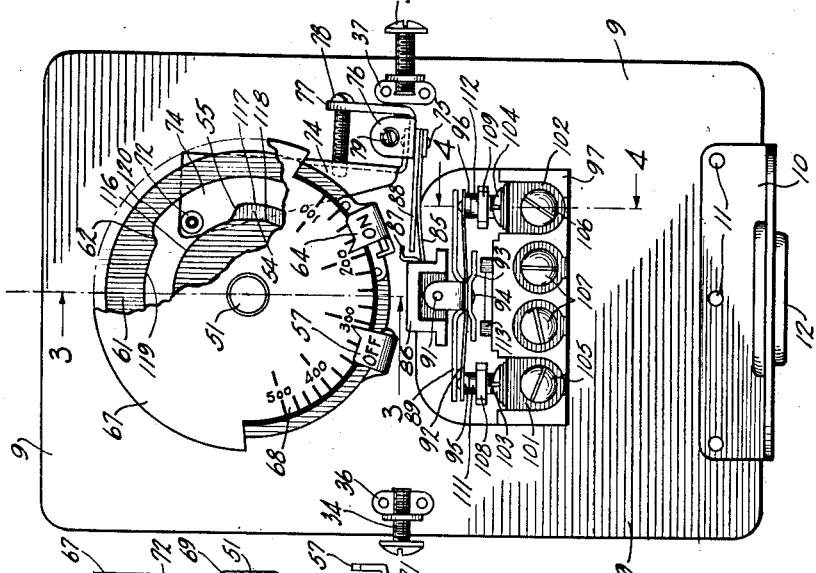
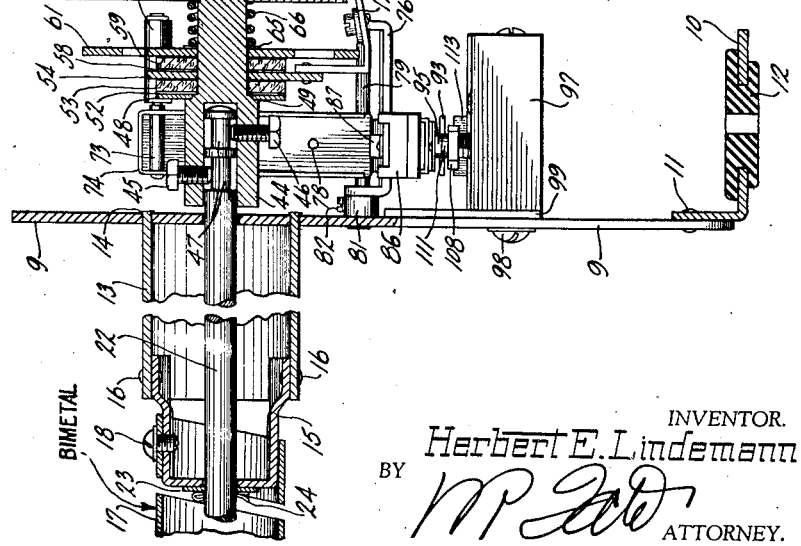
INVENTOR.
Herbert E. Lindemann
BY
ATTORNEY.

Patented Feb. 25, 1941

2,233,018

UNITED STATES PATENT OFFICE

REISSUED JUL 7 1942

2,233,018

CONTROL DEVICE

Herbert E. Lindemann, Milwaukee, Wis., assignor to Perfex Corporation, Milwaukee, Wis., a corporation of Wisconsin Application November 29, 1937, Serial No. 176,950

20 Claims. (Cl. 200—138)

This invention relates to control devices but more particularly to automatic control devices for use in air conditioning systems.

It is the usual practice in air conditioning systems to provide a heating plant for warming the air in a space and in some cases to provide means for circulating the heated air. In order to control the heating plant within certain limits and to maintain the space at a comfortable temperature some form of room thermostatic control device is usually provided to regulate the generation of heat. To further insure greater uniformity of temperature and to safeguard against excessive temperature in the heating plant, it has been customary to supplement the room thermostat with a further control device arranged to respond directly to the heating plant and commonly called a limit control. This limit control may be located on the warm air duct or the bonnet of a warm air furnace. It is likewise desirable that the heated air be forced or circulated to the space to be heated and the control device in another of its applications functions to prevent the air being circulated until it reaches a predetermined temperature.

The present invention is concerned with an automatic control device which is arranged to respond to the various temperature changes of an air conditioning system, and the principal object is to provide an improved control device for the aforesaid purpose which will function to regulate the air conditioning system in a more reliable and satisfactory manner.

A further object is to provide an automatic control device which is extremely sensitive to temperature changes and also accurate and reliable in operation.

It is an object of the invention to provide a thermostatic control device in which improved cam means are provided for actuating the switching mechanism, together with simple means for adjusting the temperature setting and differential operation of the cams.

Another object is to provide an improved switching mechanism in a control device whereby snap actuation of the switch mechanism is obtained.

An additional object is to provide improved cam means whereby the bi-metallic element is permitted to freely continue to move in a certain direction after the cams have actuated the switching mechanism, thereby preventing strain upon the element.

An additional object is to provide a control device having a more simplified and accurate adjusting means for regulating the response of the device.

Other objects and advantages of the control device reside in certain novel features of construction, arrangement and combination of the various parts which will be hereinafter more fully described and particularly pointed out in the appended claims.

While it has been pointed out that the invention is applicable as a limit control for the protection of heating plants and also to control the circulation of air in air conditioning systems, it is also adaptable for use as an operative control for motors, valves, etc.

A preferred form of the invention is illustrated in the accompanying drawings in which:

Fig. 1 is a perspective view of the complete control device;

Fig. 2 is a full size plan view of the device with the cover removed and switching mechanism in closed position;

Fig. 3 is a cross-sectional side view along the line 3—3 of Fig. 2 to show the operating mechanism;

Fig. 4 is a side view with the cover in section and a portion cut along the line 4—4 of Fig. 2 to show the switching mechanism;

Fig. 5 is a cross-sectional view of the universal mounting arrangement of the control device;

Fig. 6 is a view of certain of the elements in extended relationship; and

Fig. 7 is a rear view of the switching mechanism in its open position.

The control device consists essentially of a flat metal mounting plate 9 having a bracket 10 attached to its lower end by rivets 11 and which is provided with an opening therein for the accommodation of a rubber grommet 12 or alternatively for the attachment of a conduit whereby the lead in wires for the control device may be extended to the switching mechanism located within the device. An elongated supporting tube 13, Fig. 3, is attached at one end to the rear side of the mounting plate 9 by staking over projections 14 on the tube, and at its other end has a U-shaped bracket 15 fastened to it by rivets 16. A condition responsive means disclosed here as a spiral bi-metallic element 17 which inherently has the characteristic of expanding and contracting when subjected to temperature changes, is attached at one end to the bracket 15 by a screw 18. The other end of the thermostatic element 17 is attached by a screw 19 to a flat end 21 of a relatively long operating rod 22 as shown in Fig. 1. This rod 22 extends through the center of the bi-metallic element 17, the bracket 15, the tube 13, and to the front side of the mounting plate 9. A washer 23 bearing against the bracket 15 and a cotter pin 24 in the rod 22, prevents longitudinal forward movement of the rod. The surfaces surrounding the openings for the rod in the mounting plate 9 and the bracket 15, serve as bearings for the rod 22 when it is subjected to rotation.

In order to support the control device as a unit in its proper position a universal mounting flange 25 is provided for it as shown in Figs. 1 and 5. An opening of sufficient size is first cut in the bonnet or warm air duct of a heating plant (not shown) to which the control may be attached, and the flange 25 consisting of two similar halves held together by rivets 26 is attached to the surface surrounding the opening by means of sheet metal screws entering the holes 27 arranged near the periphery of the flange 25. A supporting collar 28 is journaled between the halves of the flange 25 as best seen in Fig. 5 and is provided with a set screw 29. After inserting the tube 13 through the collar 28 the desired distance, the collar may be locked in place on the tube 13 by the screw 29. A pair of holding screws 31 and 32 are provided on the flange 25 and engage the collar 28 in order to lock the control unit horizontally in place upon the collar 28 at any particular angle at which the flange may be supported as indicated by the dotted lines in Fig. 5.

A protective dust tight enclosure or cover 33 preferably made of some molded plastic insulation material, is provided for the control unit. It has a ledge around it which embraces the edges of the mounting plate 9 and at its bottom end has an opening the edges of which engage the conduit bracket 10 so that the cover may be easily slid off and on from the plate 9. In order that the cover 33 may be securely but removably held on to the mounting plate 9 a pair of holding screws 34 and 35 are supported by lugs 36 and 37 on the plate 9 and are arranged so that their heads engage recessed slots 38 in the cover 33. The front of the cover 33 has an ornamental name plate 39 suitably attached thereto as by rivets 41. The name plate 39 has an opening therein and another opening is made in the cover 33, which openings are closed by a window 42 so that scale readings of the instrument may be clearly visible from the outside. A pointer 43 rigidly supported on the rear side of cover 33 is also in a position to be visible through the window 42.

The operating cam assembly for actuating the switching mechanism will now be pointed out with particular reference to Figs. 3 and 6. A hollow hub member 44 into which the end of the rod 22 extends is securely but removably held thereto by the set screws 45 and 46 extending into recesses 47 in the rod 22 so that the complete unit may be first assembled and then secured to the rod in any particular rotary position. A small clearance between the hub 44 and the mounting plate 9 must be provided in order that the rod 22 may shift when the bi-metallic element 17 expands and contracts. A limit washer 48 is rigidly secured to a shoulder 49 on the hub 44 as by a staking operation and a shaft 51 integral with the hub 44 extends from one end thereof upon which the remaining elements of the assembly are loosely supported. Friction means comprising a paper washer 52 and a cork or fiber composition washer 53 are placed upon the shaft 51 after which an "off" cam member or disc 54 is arranged upon the shaft. The "off" cam 54 has an operating cam surface 55 formed on its periphery and also an adjusting arm 56 having a pointer 57 at its end, the purposes of which will be hereinafter pointed out. The foregoing elements are yieldingly clamped together and their relationship is such that when the "off" cam disc 54 is manually rotated about the shaft 51 in making an adjustment, the friction washers 52 and 53 effect a sliding rotative movement either against the side of the limit washer 48 or the cam 54. In this manner the "off" cam may be rotatably positioned to any desired point and frictionally held in its set position to enable it to perform its required function.

The next group of elements placed upon the shaft 51 in the order named are friction means comprising the paper washer 58 and composition washer 59, and an "on" cam disc 61 which is provided with a slotted opening having a cam surface 62 thereon and an adjusting arm 63 having a pointer 64 at its end. As with the "off" cam 54, the "on" cam 61 is adapted to be manually and forcedly positioned to effect an adjustment which is accomplished by turning it against the friction of the friction washers 58 and 59. This effects a sliding movement of the friction means against the side of the "off" cam 54, which of course must be manually restrained to keep it from turning at this time. With the foregoing arrangement it is seen that the setting of each cam can be conveniently varied independently of the other. While the paper washers 52 and 58 have been shown as positioned adjacent the composition washer 53 and 59 to form the friction means they are only necessary to prevent sticking of the cams which may occur through long disuse of the adjustment. The paper washers may be dispensed with entirely and only a composition washer used provided it is made of a material which will not stick or bind the cams.

A thin metal bearing washer 65, a relatively strong compression coil spring 66, and a scale plate 67 having a calibrated scale 68 thereon are next placed in their respective order upon the shaft 51. The scale plate 67 is securely and rigidly staked to a turned over portion 69 of the shaft 51 so that the coil spring 66 can exert its full force against all of the elements between it and the limit washer 48 and thereby clamp them together in frictional engagement as has been pointed out. This permits the hub 44 to impart rotary movement to the cam discs 54 and 61. With the elements in their assembled relationship the pointers 57 and 64 project forward to the front face of scale plate 67 and indicate a certain reading on the calibrated scale 68, depending upon their setting, the "off" cam indicating the temperature at which the switching mechanism will open a circuit and the "on" cam indicating the temperature at which the switch closes the circuit.

Since the scale plate 67 is rigidly secured to the hub 44 the scale 68 rotates past the fixed pointer 43 to indicate the temperature surrounding the element 17. As the "off" cam 54 and the "on" cam 61 are carried along with the hub 44 their cam surfaces 55 and 62 as well as the adjustable pointers 57 and 64 are likewise rotated by the element 17.

Extending into the circular slot in the "on" cam 61 and placed in a position to be acted upon by the cam surfaces 55 and 62 is an operable element in the form of a roller member 72, Fig. 2.

This roller 72 is supported freely on a bearing pin 73 (see Fig. 3) which is fastened to the end of an operating arm 74 formed from a flat piece of metal bent into a U-shape to render it more rigid. At its lower end the operating arm 74 is fastened by rivets 75 to a pivoted bracket 76. This bracket 76 has an extension member 77 into the end of which an adjusting screw 78 extends and threads into the side of the operating arm 74 (see Figs. 2 and 7). By turning the adjusting screw 78 the relative positions of the operating arm 74 and the extension member 77 may be conveniently adjusted. The bracket 76 is pivoted for rotation upon a pivot pin 79 one end of which is fastened securely in a supporting stud 81 by a set screw 82 threaded into the stud. The supporting stud 81 in turn is fastened to the mounting plate 9 by staking a turned over portion of the stud to the plate. The other end of the pivot pin 79 has a slot 83 cut into it, Fig. 4, through which one end of a small tensioned coil spring 84 wound around the pin 79 extends. The other end of the spring 84 engages the side of the pivoted bracket 76 so that the spring normally tends to exert a slight pressure in a clockwise direction, Fig. 2, upon the operating arm 74. The proper amount of tension in the spring 84 may be conveniently applied to it by loosening the set screw 82 from the pivot pin 79, turning the pin by applying a screw driver to its slotted end 83, and then tightening the set screw 82.

The means for actually controlling the physical condition to which the control device responds is here shown in the form of a switching mechanism which controls the circuit of some air conditioning device. The movable portion of this switching mechanism is carried by the pivoted bracket 76. One end of a resilient switch operating arm 85 is fastened to the bracket 76 by the rivets 75, and the other end is suitably fastened to an insulating block 86 which carries a stop member 87. The stop member 87 is adapted to be engaged by the end of a stiff stop arm 88 which is secured by the rivets 75 to the bracket 76 alongside of the resilient operating arm 85. The purpose of this stop arm 88 will be pointed out hereinafter. A rigid bar 89 is provided with a pair of turned up ear portions that are secured on each side of the insulation block 86 to a pivot pin 91 extending through the block in such a manner as to permit free swinging movement of the movable portion of the switching mechanism. The rigid bar 89 supports a flexible bar 92 and an iron armature 93 by means or rivets 94 attached at the midportions of these elements. The extreme ends of the flexible bar 92 carry a pair of movable control elements shown here as electrical contact points 95 and 96.

The stationary portion of the switching mechanism is supported upon an insulating terminal block 97 which is secured to the mounting plate 9 by screws 98 threaded from the rear thereof. An insulating plate 99 is interposed between the terminal block 97 and mounting plate 9 to further electrically isolate the switching mechanism from the plate 9. A pair of terminal plates 101 and 102 are imbedded on each end of the terminal block 97 and are attached to it by holding screws 103 and 104 at the top of the block. At the front of the block terminal screws 105 and 106 for the attachment of the connecting wires (not shown), are threaded into the terminal plates 101 and 102. An auxiliary pair of terminal screws 107 threaded into the block 97 may be used for the attachment of wires which are not directly associated with the switching mechanism. The terminal plates 101 and 102 also carry adjustable contact studs 108 and 109 which are threaded into the plates and have fixed control elements shown here as contact points 111 and 112 attached to the top ends thereof in a position directly opposite and in operative relation to the set of movable contact points 95 and 96. Situated in the insulating block 97 between the contact studs 108 and 109 is a permanent magnet 113 which is secured in a recess in the block by clamping plate 114 and clamping screw 115, Fig. 7. The magnet 113 is arranged in position so as to exert its magnetic influence upon the armature 93 when the switching mechanism is closed as shown in Fig. 2, and the gap between these elements may readily be adjusted by turning either of the studs 108 and 109 until the proper separation is arrived at. With the contacts closed the stop bar 89 prevents the actual engagement of the armature with the magnet.

After the contacts 108 and 109 have been adjusted to give the desired clearance between the armature 93 and the magnet 113, the calibrating screw 78 is then adjusted to cause the roller 72 to almost engage the cam surface 116 with the contacts in closed position. The coil spring 84 keeps the resilient arm 85 slightly bowed although the roller 72 is not in direct engagement with the cam surface 116.

In pointing out the detailed operation of the control device assume that the device in its normal operation has closed the switching or control mechanism and that the bi-metallic element 17 is subjected to a temperature value such that the scale plate 68 is rotated to a position opposite the fixed pointer 43 to indicate a reading of approximately 257 degrees as shown in Fig. 2. The operable roller element 72 in this case will be in a position midway between the two cam surfaces 55 and 62 and in the path of the cam 55 as shown, and since the closing of the switching mechanism has caused the generation of more heat for example, the bi-metallic element 17 will follow the temperature rise and tortionally rotate the cam assembly in a counter-clockwise direction. As this movement continues the fixed pointer 43 eventually indicates a temperature of 305 degrees (the "off" pointer setting) on the scale 68 and the cam surface 55 thereupon engages the roller 72 and forces it outward thereby rotating the operating arm 74 clock-wise about its pivot 79. The operating arm as a result operates the switching mechanism to open the contacts with a snap action into the position illustrated in Fig. 7. This opening snap action is somewhat assisted by the coil spring 84 which now maintains the roller 72 outward in the path of movement of the cam 62. From the foregoing it is seen that fixed pointer 43 directly indicates to an observer the temperature surrounding the bi-metallic element 17 at the particular moment the observation is made, because the scale 68 is directly moved by the element in front of the pointer. The observer can also note at the same time by the positions of the "off" and "on" cam pointers at what temperature the control device is set to cut the switching mechanism in or out and how close to either of these positions the temperature is at the particular moment.

Considering now in detail the action of the switching mechanism itself when it functions to open the contacts, the bracket 76 in its clock-wise movement moves one end of the resilient operating arm 85 and since its other end is attached to the insulating block 86 a slight rotation is initially effected about pivot pin 91 as tension is gradually stored in the resilient arm 85. When sufficient tension is acquired by the resilient arm to overcome the magnetic pull of the magnet 113 upon the armature 93, the movable contacts 95 and 96 are separated from the fixed contacts 111 and 112 with a quick snap action. The actual contact separation however, does not take place until a time shortly after the balance of force between the resilient arm and the magnet has been passed. This is obtained by the flexure of the flexible arm 92 maintaining the contacts closed as the rigid stop bar 89 moves away from the rear of the movable contacts. Coil spring 84 contributes somewhat to the snap action of the contacts in addition to maintaining the switching mechanism in its now opened position. Prior to the separation of the contacts the action of the resilient operating arm 85 in its flexure also moves the pivot 91 by shortening the radius between the pin 91 and pin 79, carrying the switching mechanism so that a slight wiping action in a longitudinal direction is effected between the contact surfaces to maintain them bright and clean. Should there be any tendency for them to stick together or to weld slightly the resilient arm effects a greater flexure until the contacts separate. Under such conditions the rigid bar 88 may engage the stop member 87 to effect a greater prying action upon the contacts if this is necessary to separate them.

The opening of the contacts causes an abatement of the heat to which the bi-metallic element 17 is subjected, and as a result it gradually cools and rotates the cam assembly back in a clock-wise direction until the fixed pointer 43 eventually indicates a temperature of 195 degrees (the "on" pointer setting) on the scale 68 and the cam surface 62 thereupon engages roller 72 to forcibly move arm 74 in a counter-clockwise direction about pivot 79 to close the switching mechanism with a snap action. In this switch closing operation the resilient operating arm 85 moves the switching mechanism towards closed position and as the armature 93 gradually comes within the magnetic influence of the magnet 113 the pull rapidly increases until the operating arm 85 effects a slight bow or arch in its length and moves away from the end of the rigid arm 88, whereupon the moving contacts engage the fixed contacts with a snap action. The stop bar 89 then engages the rear side of the movable contacts to hold them firmly in engagement so that the switch is not effected by vibration or other disturbances and at the same time it prevents the actual engagement of the armature with the magnet. The flexible bar 92 is slightly bowed at this time so that a small wiping action takes place upon engagement of the contacts before the stop bar 89 engages the rear of the movable contacts and in addition this flexure of the flexible bar 92 minimizes the possibility of the contacts effecting a "bouncing" action due to impact upon their engagement.

The detailed structure and operation of the cam discs 54 and 61 and their control over the roller 72 will now be pointed out more specifically with particular reference to Figs. 2 and 6. The cam disc 54 is provided with a lower retaining surface 116 which extends from the cam surface 55 around to the opposite side of the disc where indicator arm 56 is attached. A higher retaining surface 117 is also provided extending in the opposite direction from the cam surface 55 and around to arm 56. The other cam disc 61 is provided with a retaining surface 118 coinciding with the retaining surface 116 of cam disc 54. In addition, this disc has an inner retaining surface 119 and an outer retaining surface 120 which extend in opposite directions from the cam surface 62.

When the switching mechanism is in its closed position the magnet 113 holds the switch closed against the tension of spring 84 and thereby holds the roller 72 near the lower retaining surface 116 of the disc 54. As the cam 54 is rotated the roller 72 moves along the lower retaining surface 116 until the cam surface 55 engages the roller and opens the switch contacts. After the switch has been opened by means of the cam surface 55, the spring 84 holds the switch open and also holds the roller 72 against the outer retaining surface 120 of the cam disc 61 until the cam surface 62 engages the roller and closes the switch. If the temperature continues to fall after the switch has been closed by cam surface 62 engaging roller 72 the roller can ride along the lower retaining surface 116 of cam disc 54 without interference by the inner retaining surface 119 of cam disc 61. In case however, should the temperature continue to rise after the cam surface 55 engages the roller to open the switch, the roller can ride along the outer retaining surface 120 of cam disc 61 without interference by the higher retaining surface 117 of cam disc 54. By arranging the cam surfaces in the manner pointed out they act as a strain release to prevent the bi-metal element 17 from being unduly strained when subjected to any temperature conditions and at the same time permit the bi-metal to actuate the switch to open and closed positions at predetermined definite temperatures. It should be noted that the switch cannot be opened when the roller is between retaining surfaces 116 and 119, and neither can the switch be closed when the roller is between retaining surfaces 117 and 120. In other words, the switch can only be opened or closed when the roller is between the retaining surfaces 116 and 120.

In order that the minimum differential setting of the cams may be accurately adjusted so that the cam surfaces 55 and 62 will permit the roller 72 to freely pass from one surface to the other without binding the same, the adjusting arm 56 is provided with an eccentric cam 121 which may be adjusted by turning its holding screw so as to provide a variable separation of the engaging surfaces between the cam 121 and a turned up portion 122 of the adjusting arm 63. In this position the pointers 57 and 64 can be moved to their minimum range of adjustment and still enable the roller 72 to be freely controlled or operated in either direction of movement.

With the switching mechanism in the closed position the rigid bar 89 and the flexible bar 92 form an electrical bridge circuit path which extends from a conductor (not shown) attached to terminal screw 105, terminal plate 101, stud 108, fixed and movable contacts 111 and 95, through the bridge bars, movable and fixed contacts 96 and 112, stud 109, terminal plate 102, to terminal screw 106 and then to a conductor (not shown) attached thereto. It will thus be seen that the movement of the rigid and flexible bars in unbridging the contacts interrupts the aforesaid series circuit path and as the bars are pivoted at 91 to the insulated block 86 either one of the set of closed contacts can be opened while the other remains closed, and the circuit path will be positively opened. The strength of the magnet 113 and spring 84 are such that the control device will function properly regardless of the position in which the control is mounted.

The control device has been disclosed as one in which the bi-metallic element 17 is arranged to open the switch contacts when the element is subjected to a rise in temperature. In case it is desired to close the contacts upon a temperature rise the bi-metallic element must be replaced by a different one in which the active and inactive portions of the bi-metal are reversed with respect to each other.

From the foregoing description it is seen that the control device disclosed presents numerous desirable advantages and while only a specific embodiment of the same has been shown it will be readily apparent that minor modifications of the same may be made by those skilled in the art without departing from the spirit of the invention, and it is therefore desired that the invention be not limited to the specific disclosure but only to the extent of the appended claims.

What is claimed is:

1. A control device comprising, a hub member, means for operating the hub member, a pair of cam members mounted on the hub member, switch operating means, means responsive to the operation of one of the cam members for actuating the switch operating means in one direction and responsive to the operation of the other cam member for actuating the switch operating means in the other direction, an adjusting arm on each cam member for independently varying the switch actuating means of the cam members with respect to the hub member, and adjustable cooperating means on the adjusting arms for predetermining the minimum separation thereof.

2. A control device comprising, a hub member, means connected to the hub member for rotating the same, a pair of cam members mounted on the hub member, a control means, means on one of the cam members for operating the control means in one direction and on the other cam member for operating the control means in the other direction, adjusting means for independently varying the point at which each of the cam members operate the control means, a scale on the hub member cooperating with the adjusting means for predetermining the point at which each cam member operates the control means, a cover for the control device having a pointer thereon positioned opposite the scale, said pointer cooperating with said scale for indicating the rotated position of the hub member.

3. A control device comprising, a hub member, physical condition responsive means for imparting rotary movement to the hub member in either direction, a pair of cam discs, means for yieldably clamping the cam discs together upon the hub member, an operable element controlled differently by each of the cam discs, means for adjusting the position of the cam discs relative to the hub member and to each other to vary the point at which they control the operable element, a pointer on each adjusting means to indicate the point to which the corresponding cam disc has been set, and an indicator for indicating the point to which the condition responsive member has rotated the hub member.

4. A control device comprising, a hub member, a condition responsive member arranged to rotate the hub member in opposite directions, cam means on the hub member having a circular opening therein, an operating member extending into the circular opening, said cam means having a cam surface on the inside of the circular opening for actuating the operating member in one direction and a second cam surface on the outside of the circular opening for actuating the operating member in the opposite direction, and retaining surfaces extending in opposite directions in the circular opening from each cam surface, said retaining surfaces being arranged with respect to each other whereby the continued rotation of the cam means after actuation of the operating member engages the operating member between certain of the retaining surfaces in one direction of rotation and between others of the retaining surfaces in the opposite direction of rotation so that the operating member is locked in its actuated position as the rotation of the cam means continues.

5. A control device comprising, a hub member, a physical condition responsive member arranged to rotate the hub member in opposite directions, cam means on the hub member having a circular opening therein, an operating member extending into the circular opening, said cam means having a cam surface on the inside of the circular opening for actuating the operating member into one position and a second cam surface on the outside of the circular opening for actuating the operating member into a second position, and a higher and lower retaining surface extending in opposite directions from each cam surface, said higher retaining surfaces being arranged opposite the lower retaining surfaces in the circular opening whereby the continued rotation of the cam means after actuation of the operating member engages the operating member between both higher retaining surfaces in one direction of rotation and between both lower retaining surfaces in the opposite direction of rotation, so that the condition responsive member is not strained and the operating member is locked in its actuated position as the rotation of the cam means continues.

6. A control device comprising, a hub member, a physical condition responsive member arranged to rotate the hub member in opposite directions, cam means on the hub member having a circular opening therein, an operating member extending into the circular opening, said cam means having a cam surface on the inside of the circular opening for actuating the operating member into one position and a second cam surface on the outside of the circular opening for actuating the operating member into a second position, and a higher and lower retaining surface extending in opposite directions from each cam surface whereby the hub member may continue to rotate after the operating member has been actuated into either of its positions, said retaining surfaces cooperating to maintain the operating member in its actuated position if the hub member continues to rotate beyond either cam surface.

7. A control device comprising, a hub member having a shoulder, physical condition responsive means for controlling the hub member, two discs on the hub member, a friction washer between the discs and a second friction washer between one of the discs and said shoulder, a compression spring for yieldably clamping the discs and washers together against the shoulder to permit manual adjustment of the discs with respect to each other and with respect to the hub member, an operating arm, cam means on each of the discs for actuating the operating arm in a different direction, and snap acting control means operated by the actuation of the operating arm.

8. A control device comprising, a hub member, means responsive to temperature changes for imparting rotary movement to the hub member, a pair of cam members arranged on the hub member, friction means engaging the sides of said cam members, means for yieldably clamping the cams and the friction means together on the hub member, said friction means arranged to permit relative adjustable movement of the cam members with respect to each other, an operating arm, cam surfaces on the cam members each arranged to actuate the operating arm in a different manner responsive to the rotation of the hub member, an indicator arm on each cam member for indicating the temperature point at which the associated cam surface actuates the operating arm, and an indicating scale on the hub member for indicating the temperature point to which the hub member is rotated.

9. A control device comprising, a pair of cam members each having a cam surface thereon, said cam members supported in adjustable relation to vary the setting of their cam surfaces, means for imparting rotary movement to the cam members, an operating arm, means on one end of the operating arm adapted to be engaged by the movement of the cam surfaces for moving the arm in either of two directions, means for pivoting the other end of the operating arm, switching mechanism connected to the pivoted end of the operating arm and actuated thereby, and adjustable means on said operating arm for calibrating the engaging point of the operating arm with the cam surfaces.

10. A control device comprising, a pair of cam members, means for imparting rotary motion to the cam members, a cam surface on each cam member, means for adjusting the relative rotary position of the cam members with respect to each other, an operating arm, an operable element on one end of the operating arm arranged in the path of movement of the cam surfaces and actuated thereby to move the operating arm in one direction or another, means for pivoting the other end of the operating arm, means for adjusting the proper position of the operating arm with respect to the cam surfaces, a fixed control element, a movable control element, means for flexibly supporting said movable element on the operating arm for movement thereby in operative relation to the fixed control element, and magnetic means cooperating with said flexible supporting means for imparting snap action to the movement of said movable control element.

11. A control device comprising, an operating arm, a pivot point supporting the arm and about which it is adapted to rotate, spring means on said pivot point normally tending to rotate the arm in one direction, adjustable cam means adapted by engagement with a portion of the operating arm to move it in either of two directions, a movable control element attached to the arm, a fixed control element arranged in operative relation to the movable control element and adapted to be associated therewith responsive to the movement of the operating arm, and magnetic means for actuating the control elements with snap action, said spring means tending to assist said snap action in one direction of the movement of the operating arm.

12. A control device comprising, an operating arm, means for pivoting the arm at one end, condition responsive means engaging the other end of the arm for moving it to either of two positions, means for adjusting the arm with respect to the engaging means, a movable control element, resilient means attaching the movable control element to the pivoted end of the arm, a fixed control element arranged in operative relation to the movable control element, magnetic means cooperating with the resilient means for providing snap action to the actuation of the control elements and for maintaining the arm in one of its positions, and spring means for maintaining the arm in the other of its operated positions.

13. A control device comprising, an operating arm, means for pivoting the arm at one end, a roller element attached to the other end of the arm, adjustable cam means arranged to variably engage the roller element to move the operating arm, means for adjusting the position of the operating arm with respect to the adjustable cam means, a resilient arm having one end attached to the operating arm at its pivot point, a flexible arm attached at its center to the other end of the resilient arm, a movable contact carried on each end of the flexible arm and actuated by the movement of the operating arm, a pair of fixed contacts cooperating with the movable contacts, and means for providing snap action to the operation of the contacts.

14. A control device comprising, a base, a pair of discs, a physical condition responsive element supported on the base and arranged to rotate the discs in either of two directions, one of said discs having a high and a low retaining surface on its periphery, the other disc having a circular slot therein formed with a retaining surface on one side of the slot coinciding with the low retaining surface of the first disc and an outer and inner retaining surface on the other side of the slot, an operating arm pivoted to the base and having one end extending into the circular slot whereby the rotation of the discs in one direction is effective to move the high retaining surface of the first disc into engagement with the operating arm to pivot it in one direction and against the outer retaining surface of the other disc so that continued rotation of the discs in the same direction can take place without straining the condition responsive element and the operating arm is locked in its moved position as the rotation continues, and whereby the rotation of the discs in the opposite direction is effective to move the inner retaining surface of the second disc into engagement with the operating arm to pivot it in the said opposite direction and against the coinciding surfaces of both discs so that continued rotation in the same direction can take place without straining the condition responsive member and the operating arm is locked in its moved position as the rotation of the discs continues, and control means actuated by the pivotal movement of the operating arm.

15. A control device comprising, a base, a first and second disc, a physical condition responsive element supported on the base and arranged to rotate the discs in opposite directions, a cam on the edge of the first disc having a higher and lower circular retaining surface extending in opposite directions from the cam, the second disc having a circular slot arranged therein with the inner edge of the slot coinciding with the lower retaining surface of the first disc, a cam on the outer edge of the slot and an inner and outer circular retaining surface extending in opposite directions from the cam, an operating arm pivoted on the base and having one end extending into the circular slot and into operative relation to the first disc, said cams arranged to alternately actuate the operating arm in opposite directions, control means arranged to be actuated by the movement of the operating arm, said retaining surfaces arranged to hold the operating arm in its actuated position during continued movement of the condition responsive element without straining said element, means for holding the operating arm in its actuated positions during the interval between alternate engagement by the cams, and means for adjusting the discs with respect to each other and with respect to the condition responsive element whereby the cams may be arranged to actuate the operating arm at any desired value of the condition responsive element.

16. A control device comprising, a base, a hollow tube attached at one end to the base, an operating rod extending through the base and tube, physical condition responsive means attached to the other end of the tube and to one end of the rod for imparting movement thereto, an operating arm supported on the base and actuated by the rod, control elements operated by the operating arm, a supporting collar surrounding the hollow tube and slidable thereon, means on the collar engaging the tube for locking the collar at any desired position on the tube, said collar having a curved outer surface, a mounting flange having a cooperating curved surface engaging the curved surface of the collar whereby the mounting flange may be universally positioned angularly with respect to the hollow tube, means on the flange engaging the collar for locking the flange at a desired angular position, and means for mounting the flange on an inclined supporting surface whereby the tube is arranged in a horizontal position.

17. A control device comprising a base, a hollow tube attached at one end to the base, an operating rod extending through the base and the tube, a physical condition responsive member having one end secured to the tube and the other end to the rod for imparting movement thereto, an operating arm pivoted on the base and actuated by the rod, control means actuated by the operating arm, a supporting collar surrounding the hollow tube and slidable thereon, means on the collar engaging the tube to lock the collar at any desired position on the tube, said collar having a convex outer surface, a mounting flange having a concave surface cooperating with and engaging the convex surface of the collar whereby the mounting flange may be universally and angularly positioned on the collar with respect to the hollow tube, means on the flange engaging the collar to lock the flange at any desired angular position, and means for mounting the flange on an angular supporting surface whereby the tube and control device are arranged in a horizontal position.

18. A control device comprising a hub member, physical condition responsive means for actuating said hub member in either of two directions of rotation, a first and a second cam member frictionally supported upon said hub member, an adjusting arm secured to each of the cam members for adjusting the position of the cam members with respect to each other on the hub member, an operating member actuated by the cam members dependent upon their adjusted position on the hub member, control means actuated by the operation of the operating member, a flexible connection between the control means and the operating member, magnetic means for holding the control means in the closed position and spring means for holding the control means in the open position after having been actuated by the operating member, and means on the cam members for locking the operating member in either of its actuated positions after having been actuated by the cam members whereby the physical condition responsive means can continue to rotate the cam members without straining the mechanism.

19. A control device comprising a hub member, temperature responsive means for actuating said hub member in either of two directions of rotation, a first and a second cam member frictionally supported upon said hub member, an adjusting arm extending from each cam member for adjusting the position of the cam members with respect to each other upon the hub member, means on one of the adjusting arms and cooperating with the other adjusting arm for varying the minimum separation between them, an operating member actuated by the cam members dependent upon their adjusted position, control means actuated with snap action by the operating member, and an indicator on each of said adjusting arms, one of said indicators indicating the temperature point at which the control means is opened and the other the point at which the control means is closed.

20. A control device comprising a movable member, a condition responsive member arranged to shift said movable member in opposite directions, cam means arranged for movement by said movable member and having an elongated opening therein, an operating member extending into said opening, said cam means having a cam surface on one side of the opening for actuating the operating member in one direction and a second cam surface on the other side of said opening for actuating the operating member in the opposite direction, and retaining surfaces extending in opposite directions in the opening from each cam surface, said retaining surfaces being arranged with respect to each other whereby continued rotation of the cam means, after actuation of the operating member, engages the operating member between certain of the retaining surfaces in one direction of movement and between others of the retaining surfaces in the opposite direction of movement so that the operating member is locked in tis actuated position as the movement of the cam means continues.

HERBERT E. LINDEMANN.